(12) United States Patent
Sekido et al.

(10) Patent No.: US 8,098,674 B2
(45) Date of Patent: Jan. 17, 2012

(54) QUEUE SELECTION METHOD AND SCHEDULING DEVICE

(75) Inventors: Mami Sekido, Yokohama (JP); Akihiro Hata, Kawasaki (JP); Satoshi Nishimura, Yokohama (JP); Yuuji Kubo, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 570 days.

(21) Appl. No.: 11/362,522

(22) Filed: Feb. 27, 2006

(65) Prior Publication Data

US 2007/0086470 A1    Apr. 19, 2007

(30) Foreign Application Priority Data

Oct. 3, 2005  (JP) .................................. 2005-290056

(51) Int. Cl.
*H04L 12/28* (2006.01)
(52) U.S. Cl. ...................................... 370/412
(58) Field of Classification Search ........... 370/412–418
See application file for complete search history.

(56) References Cited

U.S. PATENT DOCUMENTS

| | | | | |
|---|---|---|---|---|
| 6,560,230 B1 * | 5/2003 | Li et al. | ..................... | 370/395.42 |
| 6,834,053 B1 * | 12/2004 | Stacey et al. | ................ | 370/395.4 |
| 2003/0058878 A1 * | 3/2003 | Minnick et al. | ................ | 370/412 |
| 2004/0120336 A1 * | 6/2004 | Hendel et al. | .................. | 370/412 |
| 2006/0187949 A1 * | 8/2006 | Seshan et al. | .................. | 370/412 |

FOREIGN PATENT DOCUMENTS

| | | |
|---|---|---|
| JP | 2000-069023 A | 3/2000 |
| JP | 2002-057704 A | 2/2002 |
| JP | 2002-252628 A | 9/2002 |
| JP | 2003-229896 | 8/2003 |

* cited by examiner

*Primary Examiner* — Chirag Shah
*Assistant Examiner* — Jenkey Van
(74) *Attorney, Agent, or Firm* — Arent Fox LLP

(57) ABSTRACT

A queue selection method for controlling selection of many queues without increasing the circuit scale is provided. Queues are organized into groups, and each group is created as a tree structure with a plurality of steps, and a queue is selected by selecting a group of each step. By this, even if the number of queues is enormous, it is sufficient to provide registers for managing the presence of packets only for the number of groups selected in each step, and it becomes unnecessary to provide registers for all of the queues, so an increase of registers can be suppressed even if the number of queues increases. It is preferable that group selection in each step is performed in parallel independently from pipeline processing so as to maintain high-speed operation.

4 Claims, 6 Drawing Sheets

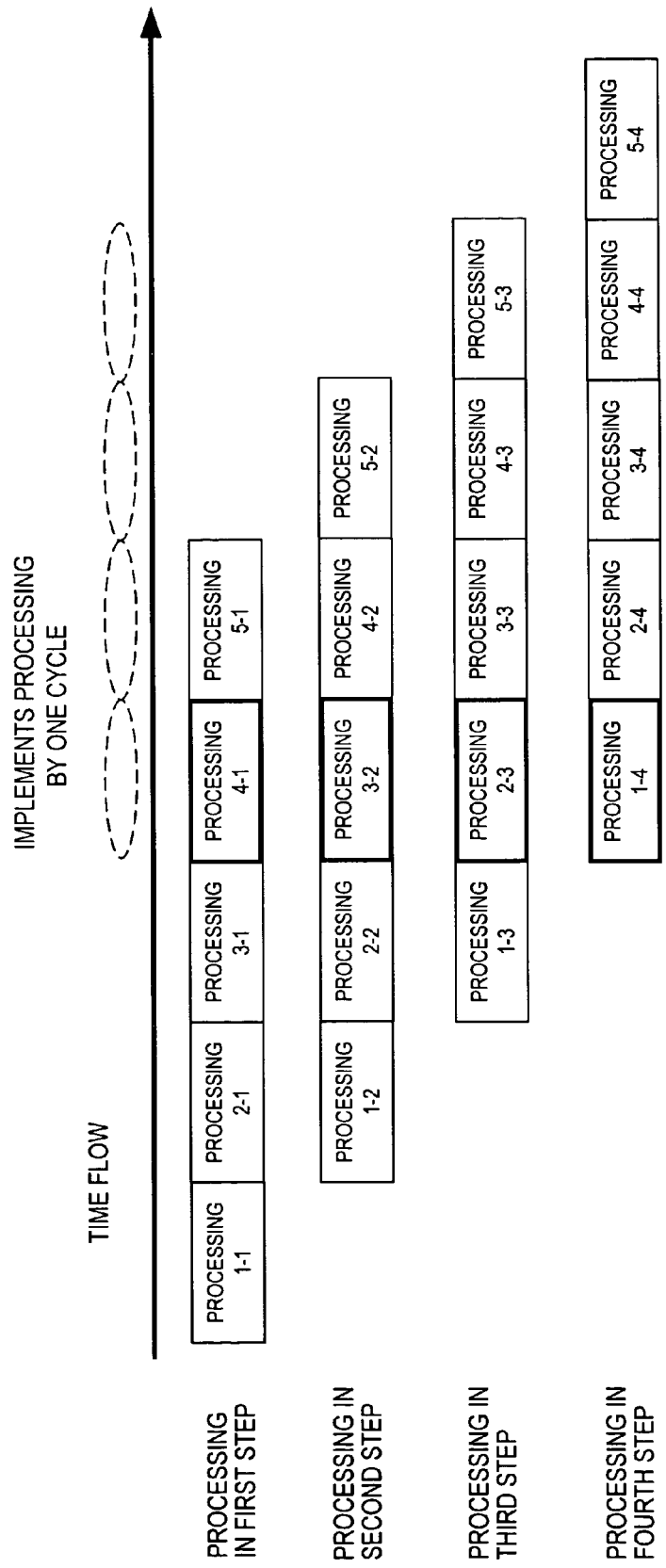

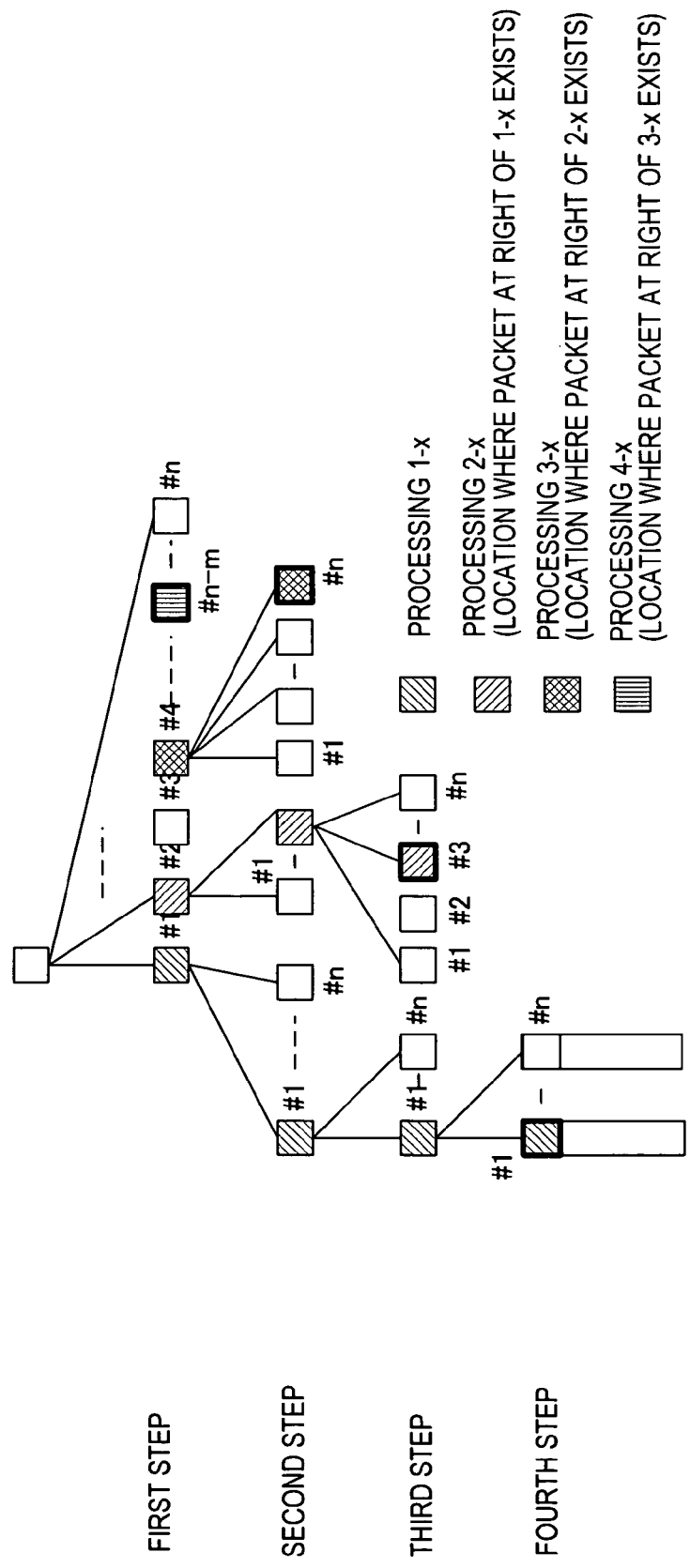

QUEUE SELECTION METHOD AND SCHEDULING DEVICE

CROSS-REFERENCE TO RELATED APPLICATIONS

This application is based upon and claims the benefit of priority from the prior Japanese Patent Application No. 2005-290056, filed on Oct. 3, 2005, the entire contents of which are incorporated herein by reference.

BACKGROUND OF THE INVENTION

1. Field of the Invention

The present invention relates to a queue selection method for controlling queue selection in communication performing packet transfer, and a scheduling device which executes the queue selection method, and more particularly to a queue selection method and scheduling device for implementing scheduling a large volume of queues.

2. Description of the Related Art

Recently an enormous amount of packet data flows through communication networks due to the spread of the Internet. To support this expansion of traffic volume, even faster speeds and large capacities are demanded for relay devices, such as routers, constituting communication networks.

Also as communication data increases, traffic concentration of specific contents begin to generate, where traffic control, using such a means as QOS (Quality of Service) is indispensable, to remove the influence on unrelated traffic and to make the flow of packets smooth.

A relay device, such as a router, which is a scheduling device to execute queue selection control of packets, transfers packets while assuring the required quality and bands of packets transmitting QOS.

FIG. 1 is a diagram depicting a conventional queue selection control. The packet to be input is buffered into a plurality of queues 2, and the queue control section 20 reads and outputs the packets from each queue 10 in a predetermined sequence.

In a conventional queue control configuration, several hundreds of (e.g. 192) queues are set in parallel, and one queue is selected from a plurality of queues using the primary encoder and ring counter so that each queue is evenly selected.

Recently as communication traffic increases, higher speeds and larger capacities for queue control are demanded. However merely increasing the number of queues increases the circuit scale accordingly. If the number of queues were increased from the current several hundred to several tens of thousands, circuit scale become enormous, even for only a register which indicates the presence of packets in a queue to enter the primary encoder, which is not practical.

SUMMARY OF THE INVENTION

With the foregoing in view, it is an object of the present invention to provide a queue selection method for controlling the selection of many queues without increasing the circuit scale and a scheduling device to execute the queue selection control.

To achieve the above object, a first queue selection method of the present invention is a queue selection method for selecting one queue out of a plurality of queues, comprising a first formation step of forming the grouping of a plurality of queues and forming a plurality of first groups, a first selection step of selecting one of the plurality of first groups, and a second selection step of selecting one of a plurality of queues included in the selected first group.

A second queue selection method of the present invention is the above mentioned first queue selection method further comprising a second formation step of sub-grouping the first groups and forming a plurality of second groups, and a third selection step of selecting one of the second groups, wherein the plurality of first groups are a plurality of first groups belonging to the selected second group.

A third queue selection method of the present invention is the above mentioned first queue selection method wherein the second selection step of selecting a first queue in the selected first group and the first selection step of selecting one of the first groups for selecting a second queue next to the first queue at the second selection step in the next timing are simultaneously executed in parallel.

A fourth queue selection method of the present invention is the above mentioned second queue selection method, wherein the second selection step of selecting a first queue in the selected first group, the first selection step of selecting one of the first groups for selecting a second queue next to the first queue at the second selection step in the next timing, and the third selection step of selecting one of the second groups for selecting a third queue next to the second queue at the second selection step after the next timing are simultaneously executed in parallel.

A fifth queue selection method of the present invention is the above mentioned first queue selection method, further comprising a management step of managing the number of packets of queues included in each of the plurality of first groups and selecting this specific first group to subtract the number of packets in queues included in a specific first group for update, wherein a first group in which no packets exist is not selected.

A sixth queue selection method of the present invention is the above mentioned second queue selection method, comprising a management step of managing the number of packets of queues belonging to each of the plurality of second groups and selecting this specific second group to subtract the number of packets belonging to a specific second group for update, and selecting this specific first group from a plurality of first groups belonging to this second group to subtract the number of packets in queues included in a specific first group for update, wherein a first group or a second group, in which no packets exist, is not selected.

A seventh queue selection method of the present invention is the above mentioned fifth queue selection method wherein in the management step, if packet reading from a specific queue included in the specific first group exceeds a setup speed, the number of packets in the specific queue is subtracted from the number of packets of queues included in the specific first group, thereby, a judgment is made that no packets exist in the specific queue, and packet reading from the specific queue stops without the specific queue being selected; and when reading is restarted, the number of packets existing in the specific queue is added to the number of packets of queues included in the specific first group, and by this it is judged that packets exist in the specific queue and selection of the specific queue is enabled.

An eighth queue selection method of the present invention is the above mentioned sixth queue selection method, wherein in the management step, if the packet reading from a specific queue belonging to the specific second group exceeds a setup speed, the number of packets in the specific queue is subtracted from the number of packets of queues belonging to the specific second group and the number of packets in queues included in the specific first group, thereby, a judgment is made that no packets exist in the specific queue, and packet reading from the specific queue stops without the specific queue being selected; and when reading is restarted, the number of packets existing in the specific queue is added to the number of packets in queues belonging to the specific second group and the number of packets in queues included in the specific first group, thereby, a judgment is made that packets exist in the specific queue, and selection of the specific queue is enabled.

Also a scheduling device for executing one of the first to eighth queue selection methods is provided.

According to the present invention, the number of registers can be decreased to be much less than the number of queues, without installing registers, for managing the presence of packets stored in each queue, for each queue, and the circuit scale can be minimized even if the number of queues increase.

Since group selection in each step is simultaneously executed in parallel by pipeline processing, high-speed queue selection is possible.

The total number of packets stored in queues can be managed in each group of each step, and the number of packets in a higher group is fed back, so a queue selection error in the higher group, while queue selection is progressing, can be prevented.

BRIEF DESCRIPTION OF THE DRAWINGS

FIG. 3 are diagrams depicting the parallel operation of queue selection according to an embodiment of the present invention;

DESCRIPTION OF THE PREFERRED EMBODIMENTS

Embodiments of the present invention will now be described with reference to the drawings. These embodiments however shall not limit the technical scope of the present invention.

An embodiment of the present invention provides a method for selecting a queue by grouping queues, forming each group to be a tree structure with a plurality of steps, and selecting a group in each step. By this, even if the number of queues is enormous, registers for managing the presence of packets are needed only for the number of groups selected in each step, and it is not necessary to prepare registers for all the queues, so even if the number of queues increases an increase of registers can be suppressed. It is preferable that the group selection in each step is performed independently in parallel by pipe line processing, so as to maintain high-speed operation.

Figure 1:
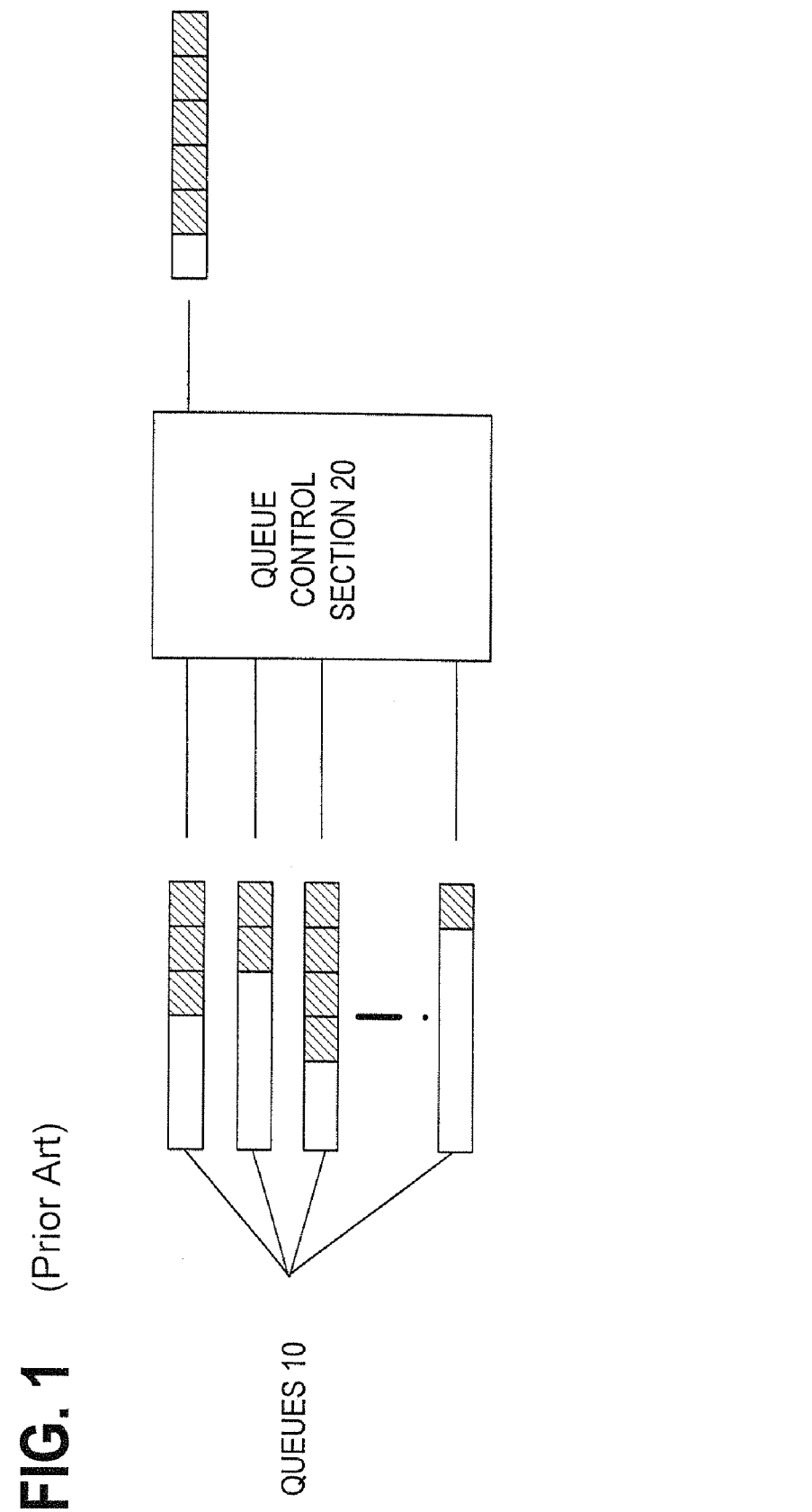
FIG. 1 is a diagram depicting a conventional queue selection control.
Figure 2:
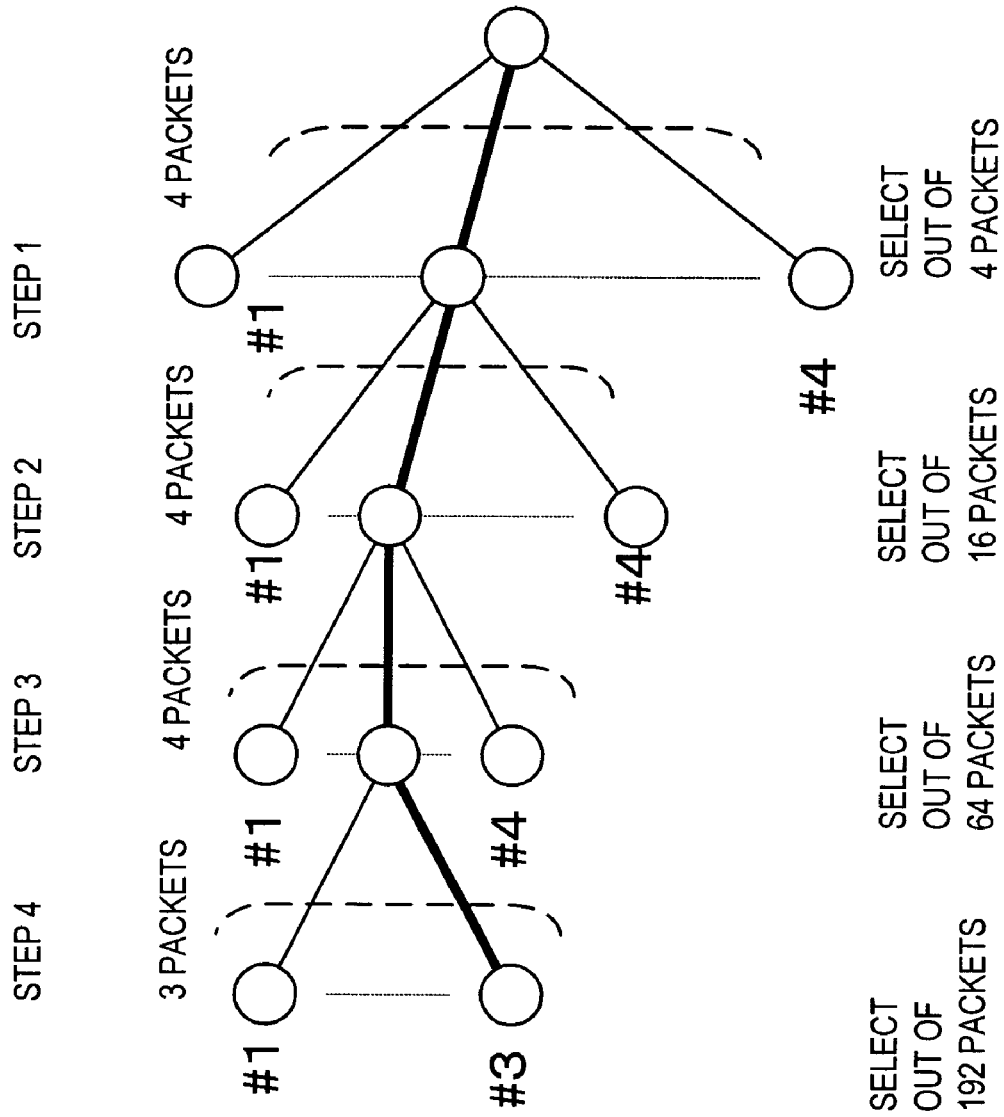
FIG. 2 is a diagram depicting a basic concept of the queue selection method of the scheduling device according to an embodiment of the present invention.

FIG. 2 is a diagram depicting the basic concept of the queue selection method of the scheduling device according to the present embodiment. Unlike prior art where the queues are formed to be one step in parallel, queues are configured to be a tree structure with a plurality of steps in the present invention, as shown in FIG. 2, and each group is selected in each step to select a queue.

If 192 queues are structured in four steps, as FIG. 2 shows, for example, 192 queues are grouped into an individual group of three queues in the fourth step, which is the lowest step, and to each group an ID, such as #1, #2 or #3, is assigned. Each group in the fourth step belongs to a group managed in the third step, which is a higher step, and each group in the third step is formed by the four groups in the lowest step, to which an ID, such as #1, #2, #3 or #4, is assigned. Each group in the third step belongs to a group managed in the second step, which is still a higher step, and each group in the second step as well is formed by four groups in the third step, to which an ID, such as #1, #2, #3 or #4 is assigned. Each group in the second step belongs to a group managed by the first step, which is the highest step, and each group in the first step as well is also formed by four groups in the second step, just like the case of the second and third steps, to which an ID, such as #1, #2, #3 or #4, is assigned.

When a queue is selected, one queue is selected by sequentially selecting the ID of a group in each step from the highest step (first step) to the lowest step (fourth step). At this time, packet presence flags (registers) are needed only for the number of subgroups included in each group of each step, and in the case of the example in FIG. 2, 15 (3+4+4+4) registers are sufficient to identify the presence of packets in 192 queues. In other words, registers are needed only for the number of groups selected in each step, and it is unnecessary to prepare registers for all the queues, so the number of registers can be dramatically decreased compared with the number of queues, and the increase of the number of registers can be minimized even if the number of queues becomes enormous.

Also when a queue is selected in a plurality of steps, a group in each step is selected for each cycle (clock), so the number of cycles (clocks) for the number of steps are required for selecting one queue. Therefore in the present embodiment, pipe line processing is used, where the selection operation in each step is independent from other steps and the operation is performed for the number of steps in parallel, so that one queue can be selected for each cycle.

FIG. 3 are diagrams depicting the parallel operation for a queue selection according to an embodiment of the present invention. FIG. 3A is a time chart of each processing, and FIG. 3B is a diagram depicting a group selected in each processing. In FIG. 3B, a group free from diagonal lines or half tones is a group of which queues have no packets, and is identified as no packets by the packet presence flag. For selecting a group in each step, a group of which queues have packets is sequentially selected from #1 (in the right direction in FIG. 3B. FIG. 3A will now be described with reference to FIG. 3B.

In the processing 1-1, which is executed in the first cycle, ID selection (e.g. #1) in the first step of the first queue selection, is performed.

In the second cycle, the processing 1-2, where a group selection (e.g. #1) in the second step of the first queue selection is performed, and the processing 2-1, where a group selection (e.g. #2) in the first step of the second queue selection is performed, are executed.

In the next cycle, the processing 1-3, where a group selection (e.g. #1) in the third step of the first queue selection is performed, the processing 2-2, where a group selection (e.g. #n) in the second step of the second queue selection is performed, and the processing 3-1, where a group selection (e.g. #4) in the first step of the third queue selection is performed, are executed.

In the next cycle (indicated by a bold frame), the processing 1-4, where a group selection (e.g. #1) in the fourth step of the first queue selection is performed, the processing 2-3, where a group selection (e.g. #3) in the third step of the second queue selection is performed, the processing 3-2, where a group selection (e.g. #n) in the second step of the third queue selection is performed, and the processing 4-1, where a group selection (e.g. #n−m) in the first step of the fourth queue selection is performed, are executed. In this stage, the first queue selection completes. Each ID selected in this cycle is indicated by a bold frame, in FIG. 2(b) as well.

And in the next cycle, the processing 2-4, where a group selection in the fourth step of the second queue selection is performed, the processing 3-3, where a group selection in the third step of the third queue selection is performed, the processing 4-2, where a group selection in the second step of the fourth queue selection is performed, and the processing 5-1, where a group selection in the first step of the fifth queue selection is performed, are executed.

In this stage, the second queue selection completes. In other words, in the cycle next to the cycle when the first queue selection completes, the second queue selection completes. In this way, by operating the group selection processing in each step independently and in parallel, one queue can be selected in each one cycle.

In the case of packet traffic control by scheduling, it is necessary to control the flow rate and the interval of each queue, and for this the selected result (ID corresponding to the selected queue, whether packets exist in each queue as a result) must be fed back to the subsequent queue selection processing. This is to prevent selecting a queue where no packets exist. However in the case of the above mentioned pipe line processing, where a plurality of queue selection processings operate in parallel and the next queue selection processing sequentially progresses before the previous queue selection completes (before one queue is selected in the lowest step), the next queue selection processing starts before the selection result is fed back.

Therefore in an embodiment of the present invention, only the number of packets is fed back in each step except in the lowest step. In other words, in each group in each step, the total number of packets stored in the queues belonging to each group is managed. Which queue of the group will be selected is not yet determined, but it is clear that one of the queues will be selected, so by managing the number of packets for each group in each step, it can be judged whether packets exist in the queues belonging to each group. By feeding back this information to the intermediate stage, the presence of packets can be fed back before final queue selection is performed. A concrete example of the present embodiment will be described below.

Figure 4:
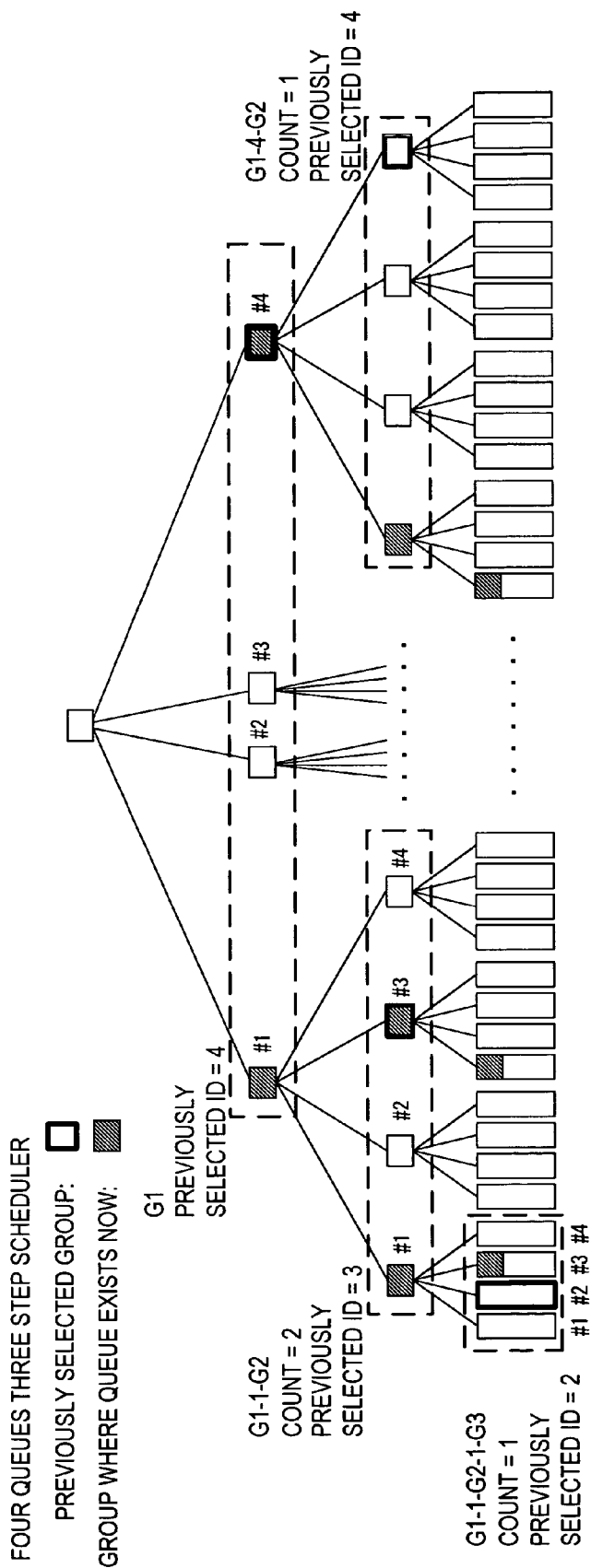
FIG. 4 is a diagram depicting an example of queue selection processing according to an embodiment of the present invention.

FIG. 4 is a diagram depicting an example of the queue selection processing according to the present embodiment. In FIG. 4, a queue selection processing by a four queue three step scheduling configuration will be described. In other words, the queues are grouped into an individual group of four queues for each step, and a total of 64 queues are identified. Here the groups in the highest step (first step) are called G1, the groups in the second step are G2, and the groups in the lowest step (third step) are G3.

In the highest step G1, each group has a packet presence flag, and also has previously selected group ID information (previously selected ID). In the case of the example in FIG. 4, a packet exists in the groups IDs #1 and #4, and the previously selected group is #4 (bold frame). In the queue selection of this example, a group in which packets exist is sequentially selected based on the packet presence flag.

Figure 5:
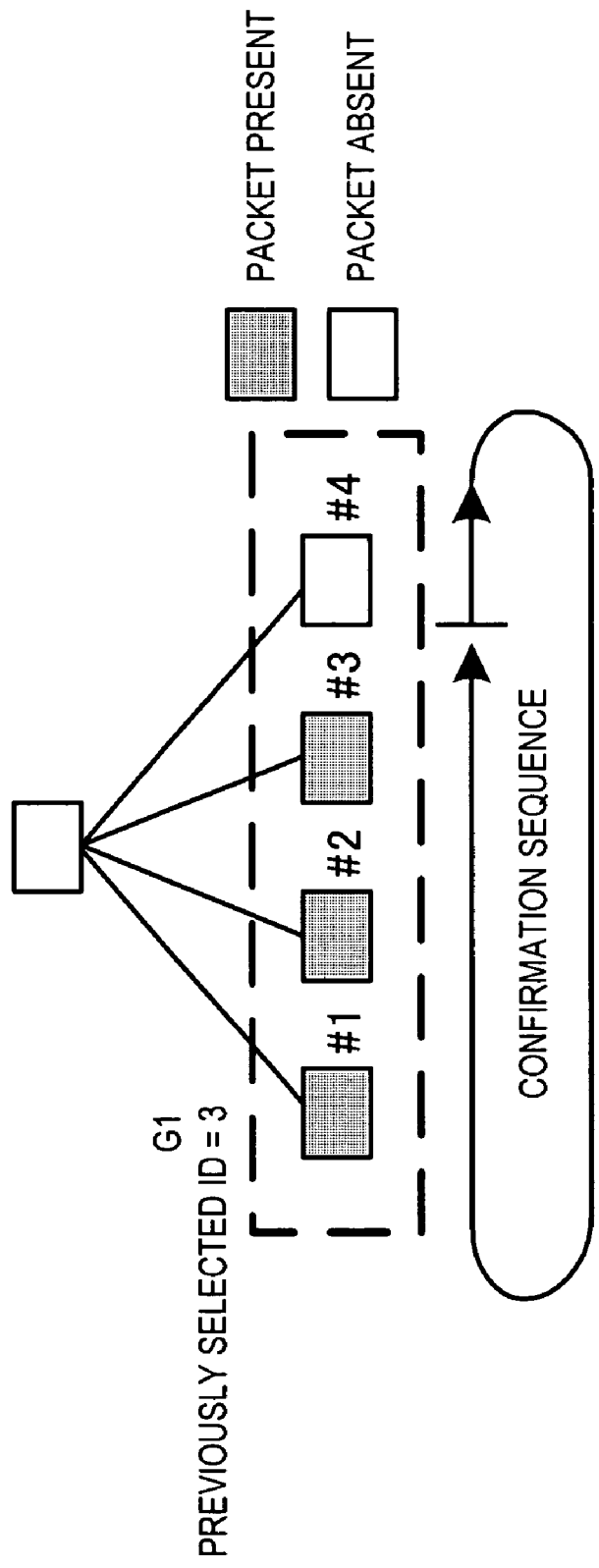
FIG. 5 is a diagram depicting the queue ID selection sequence.

FIG. 5 is an example depicting the sequence of the group ID selection. As FIG. 5 shows, the group ID is selected in the sequence of group ID #1, #2 and #3, and if the previously selected ID is #3 and no packets exist in the group ID #4, then the selection sequence returns to #1, and #1 is selected. If packets exist in the group ID #4, needless to say #4 is selected. In this way, by setting the previously selected ID and selecting the ID next to the previously selected ID the next time, each group, that is, queues belonging to each group can be sequentially and evenly read.

Back in FIG. 4 in the second step G2, each group with a group ID has a packet presence flag, and also has previously selected group ID information (previously selected ID), just like the highest step G1, and also has packet count information (counter) stored in the queue belonging to each group. In the case of the example in FIG. 4, the group G1-1-G2 belonging to G1 #1 and the group G1-4-G2 belonging to G1 #4 are shown. In G1-1-G2, packets exist in the group IDs #1 and #3, and the previously selected ID is #3 (bold frame). Since the group G1-1-G2-1-G3 belonging to (G1-1-G2) has two packets, the counter value is 2. In G1-4-G2, packets exist in the group ID #1 and the previously selected ID is #4 (bold frame). Since the group G1-1-G2-4-G3 belongs to [G1-4-G2], the counter value is 1.

In the lowest step G3, each group with a group ID has a packet presence flag, previously selected group ID information (previously selected ID), and packet count information (counter), just like the second step G2. In the case of the example in FIG. 4, in the group G1-2-G2-1-G3 belonging to G2 #1, packets exist in the group ID #3 and the previously selected ID is #2 (bold frame). Since there is only one packet in this group, the counter value is 1. One packet also exists in another group of G3 (a group belonging to G2 #3) G1-2-G2-3-G3.

The queue selection processing in the current cycle in this status will now be described.

<First Cycle>

(1-1) As a queue selection processing for the first queue, the group ID #1 (G1-1) is selected from the highest step G1 (since the previously selected ID is #4).

(1-2) By the selection in (1-1), the counter value of G1-1-G2 is decremented 1 (counter value =2→1). As described above, the next queue selection processing starts in the next cycle, so the counter value is decremented within the first cycle period.

(1-3) Since the counter value is not 0 after the counter value is decremented in (1-2), the packet presence flag in G1-1 maintains the "packet presence" status. This is because packets belonging to G1-1 remain even if one queue belonging to G1 #1 is selected in the next or later cycles. The packet presence flag is also updated within the first cycle period.

(1-4) The previously selected ID is updated to #1. This is also executed within the first cycle period.

<Second Cycle>

Now the queue selection processing in the second cycle, which is subsequent to the current cycle, will be described.

(1-5) As a queue selection processing for the first queue, the group ID #1 (G2-1) is selected in the second step G1-1-G2 (since the previously selected ID of G2 is #3, no packets exist in the next ID #4, and the next group ID where packets exist according to the selection sequence is #1).

(1-6) By the selection in (1-5), the counter value of G1-1-G2-1-G3 is decremented 1 (counter value =1→0).

(1-7) Since the counter value becomes 0 after the counter value is decremented in (1-6), the packet presence flag in G1-1-G2-3 is updated to "packet absent" status.

(2-1) In parallel with the above processings (1-5) to (1-7), the group ID #4 (G1-4) is selected in the highest step G1 as the queue selection processing for the second queue. This is because the previously selected ID has been updated to #1 and no packets exist in the group IDs #2 and #3. The presence of packets in each group can be confirmed by the packet presence flag, and in this case the packet presence flags of the group IDs #2 and #3 are in "packet absent" status.

(2-2) By the selection in (2-1), the counter value of G1-4-G2 is decremented 1 (counter value =1→0).

(2-3) Since the counter value becomes 0 after the counter value is decremented in (2-2), the packet presence flag in G1-4 is updated to "packet absent" status.

(2-4) The previously selected ID is updated to #4.

<Third Cycle>

(1-8) As the queue selection processing for the first queue, the group ID #1 (G3-3) is selected in the lowest step G1-1-G2-1-G3 (since the previously selected ID of G3 is #2).

(1-9) The previously selected ID is updated to #3.

(2-5) In parallel with the above processings (1-8) and (1-9), the group ID #1 is selected in the second step G1-4-G2 as the queue selection processing for the second queue (since the previously selected ID is #4).

(2-6) By the selection in (2-5), the counter value of G1-4-G2-1-G3 is decremented 1 (counter value =1 →0).

(2-7) Since the counter value becomes 0 after the counter value is decremented in (2-6), the packet presence flag in G1-4-G2-1 is updated to "packet absent" status.

(3-1) In parallel with the above processings (1-5), (1-9) and (2-5) to (2-7), the group ID #1 (G1-1) is selected in the highest step G1 as the queue selection processing for the third queue (this is because the previously selected ID has been updated to #4).

(3-2) By the selection in (3-1), the counter value in G1-1-G2 is decremented 1 (counter value =1-0).

(3-3) Since the counter value becomes 0 after the counter value is decremented in (3-2), the packet presence flag in G1-1 is updated to "packet absent" status.

(3-4) The previously selected ID is updated to #1.

Hereafter the above mentioned processing is repeated as long as there is a queue where packets exist.

As described above, the next queue where a packet exists is selected according to the selection sequence depending on the status of the packet presence flag, and by installing the counter for the total number of packets belonging to a group for each group in each step, except the highest step, whether packets are stored in a queue belonging to a group can be recognized in the intermediate stage, and the packet presence flag can be controlled. If the number of packets becomes 0, this means that no packets are stored in the queues belonging to a group, the packet presence flag becomes "packet absent" status, and from the next cycle the groups in this step are not selected.

Packets are input to the queues as required, and if a packet is input to a queue, the packet count is incremented 1.

In the above example, the processing of evenly selecting queues in which packets exist using the previously selected ID was described, and in this case the read amount (read speed) from each queue in which packets exist is the same. However if a flow rate limit (read speed limit) is set for each queue and the read speed being set in each queue is not always the same, queue selection control must be performed without exceeding the limit.

A method for managing the flow rate (read speed) is temporarily setting the counter value of the group, in the lowest step corresponding to the queue which reached the flow rate limit, to zero. In other words, the number of packets currently stored in the queue is subtracted from the current counter value. Corresponding to this, the same value is decremented in the counter value of each group in the higher step of this group. This is for maintaining the consistency of the counter values among groups in each step. In this case, the counter value of the group is the total number of packets with the other queues belonging to this group, so if packets are stored in other queues, the counter value of the group in the highest step does not become zero.

When the counter value of a group in the lowest step corresponding to the queue which exceeded the limit becomes zero, the packet presence flag of this group becomes "packet absent" status, and this group is no longer selected in the sequential selection using the previously selected ID. By this, the packet exceeding the flow rate limit being set for the queue is no longer read, and the flow rate limit being set for the queue is maintained.

If a flow rate limit is set in predetermined time (e.g. one second) units, for example, the flow rate is monitored in predetermined time units, and if the flow rate is limited as described above when a predetermined time is progressing, the flow rate limit is cancelled when the next predetermined time starts.

In other words, the current (when reading starts) number of packets stored in a queue of which flow rate is limited is added to the counter value, and the same value is also incremented in the counter of the group containing this queue in the higher step. The counter value of the queue of which flow rate is limited does not become zero, and the packet presence flag becomes "packet present" status. By this, the selection of this queue is enabled, and the status becomes normal where the flow rate is not limited.

What is claimed is:

1. A queue selection method for selecting one queue out of a plurality of queues, each queue including a number of packets, comprising:
   grouping a plurality of queues and forming a plurality of first groups;
   selecting one of the plurality of first groups;
   selecting one of a plurality of queues included in the selected first group; and
   counting a total number of packets of all the queues in each of the plurality of first groups,
   wherein, when a packet reading from a specific queue included in the selected first group exceeds a setup speed, the number of packets in the specific queue is subtracted from the number of packets in queues included in the selected first group, thereby, a judgment is made that no packets exist in the specific queue, and packet reading from the specific queue stops without the specific queue being selected, and when after a certain time passed, the number of packets existing in the specific queue is added to the number of packets in queues included in the selected first group, thereby, a judgment is made that packets exist in the specific queue and selection of the specific queue is enabled, and
   wherein a first group in which no packets exist is not selected.

2. The queue selection method according to claim 1, wherein selecting a first queue in the selected first group and selecting one of the first groups for selecting a second queue next to the first queue at the second selection step in the next timing are simultaneously executed in parallel.

3. A queue selection method for selecting one queue out of a plurality of queues, each queue including a number of packets, comprising:
   grouping a plurality of queues and forming a plurality of first groups;
   grouping the plurality of first groups and forming a plurality of second groups;
   selecting one of the plurality of second groups;

selecting one of the first groups belonging to the selected second group;

selecting one of a plurality of queues included in the selected first group; and counting in each of the plurality of first groups, counting a total number of packets of all the queues in each of the plurality of second groups, wherein, when a packet reading from a specific queue exceeds a setup speed, the number of packets in the specific queue is subtracted from the total number of packets in queues belonging to the selected second group and total number of packets in queues included in the selected first group, thereby, a judgment is made that no packets exist in the specific queue, and packet reading from the specific queue stops without the specific queue being selected, and when after a certain time passed, the number of packets existing in the specific queue is added to the total number of packets in queues belonging to the selected second group and the total number of packets in queues included in the selected first group, thereby, a judgment is made that packets exist in the specific queue and selection of the specific queue is enabled, and wherein a first group or a second group in which no packets exist is not selected.

4. The queue selection method according to claim 3, wherein selecting a first queue in the selected first group selecting one of the first groups for selecting a second queue next to the first queue in the next timing, and selecting one of the second groups for selecting a third queue next to the second queue after the next timing are simultaneously executed in parallel.

* * * * *